United States Patent

Parker

[15] 3,638,729
[45] Feb. 1, 1972

[54] WATER FLOODING METHOD USING GEL AND VISCOSITY-INCREASING MATERIALS

[72] Inventor: Harry W. Parker, Lubbock, Tex.
[73] Assignee: Phillips Petroleum Company
[22] Filed: May 27, 1970
[21] Appl. No.: 41,066

[52] U.S. Cl. ............................. 166/273, 166/275
[51] Int. Cl. ............................................. E21b 43/22
[58] Field of Search ................... 166/273-275, 283, 166/294, 295

[56] References Cited

UNITED STATES PATENTS

| | | | |
|---|---|---|---|
| 2,827,964 | 3/1958 | Sandiford et al. | 166/274 |
| 3,500,929 | 3/1970 | Eilers et al. | 166/295 |
| 2,874,545 | 2/1959 | Twining | 166/294 X |
| 3,302,717 | 2/1967 | West et al. | 166/283 |
| 3,353,604 | 11/1967 | Gibson et al. | 166/274 |
| 3,402,137 | 9/1968 | Fischer et al. | 166/275 UX |
| 3,415,319 | 12/1968 | Gibson | 166/295 |
| 3,421,582 | 1/1969 | Fallgatter | 166/273 |

*Primary Examiner*—Ian A. Calvert
*Attorney*—Young and Quigg

[57] ABSTRACT

A water flooding method wherein gel and viscosity-increasing materials are separately, intermittently injected into a stream of floodwater being injected into one or more wells to develop and maintain a uniform flood front.

9 Claims, No Drawings

WATER FLOODING METHOD USING GEL AND VISCOSITY-INCREASING MATERIALS

This invention relates to an improved method for water flooding a hydrocarbon containing formation. In another aspect, this invention relates to a method of water flooding a hydrocarbon containing formation by which a more uniform flood front is developed and maintained.

In heretofore utilized water floods, the floodwater is injected downwardly through one or more injection wells, into the hydrocarbon-containing formation and through the formation to drive hydrocarbons contained therein into one or more remotely located producing wells, there to be produced to the surface and captured. Owing to the properties of the floodwater and the formation, injection and subsequent liquid movement rates through the formation are greater over the more permeable portions of the formation. Because of this uneven injection distribution over the thickness of the hydrocarbon-containing formation, sometimes large volumes of hydrocarbons are bypassed by the flooding water.

It is therefore an object of this invention to provide a more efficient water flooding method for recovering hydrocarbons from a subterranean formation. Another object is to provide a method for regulating the injectivity profile of the injection well. Yet another object of this invention is to provide a method for developing and maintaining a uniform flood front. Other aspects, objects, and advantages of the present invention will become apparent from a study of the disclosure and the appended claims.

In the operation of this water flooding method, a subterranean hydrocarbon-containing formation is penetrated by at least one injection well and at least one remotely located producing well. It should be understood, however, that this invention can be practiced where a plurality of producing and injection wells are utilized to flood and produce a common hydrocarbon-containing formation. The relative placements of the producing wells are remote from any injection well and can be in various patterns such as five spots, seven spots, nine spots, etc., as known in the art.

Flood water is injected downwardly through the injection wells into the hydrocarbon-containing formation, thereby forcing hydrocarbons into the remote producing well where they are produced to the surface and captured. A substantially continuous stream of floodwater is injected downwardly through one or more injection wells into the formation. Volumes of viscosity increasing material and gel particles are separately, intermittently injected into the floodwater in the formation each at spaced apart intervals while hydrocarbons entering the producing wells are produced to the surface and captured.

The following are examples of the viscosity-increasing materials and examples of the gel particles that can be utilized with this invention.

| Viscosity Increasing Material | Gel Particles |
|---|---|
| Partially hydrolyzed polyacrylamides | partially hydrolyzed polyacrylamides gelled with polyvalent metal ions such as iron or formaldehyde |
| carboxymethyl cellulose | |
| guar gum | lignosulfonates gelled with sodium dichromate |
| Kelzan | |

*Kelzan is an xanthan gum product that is classified as a carbohydrate and is a complex polysaccharide gum having a molecular weight of more than one million.

In order to provide a volume of floodwater having sufficient gel particles to plug a portion of the pore spaces sufficiently large to cause detectable change of flow characteristics through the formation, it is preferred that the gel particles be mixed with the floodwater in a concentration range of about 0.1 percent to 0.001 percent by volume and that the total volume of injected mixture be at least 0.5 pore volume. In order to provide another volume of floodwater with sufficiently increased viscosity to significantly decrease the fingering of the floodwater through the formation and the development of a more uniform flood front, it is preferred that the viscosity-increasing material be mixed with the floodwater in a concentration range of about 0.05 percent to 0.1 percent by volume. Where it is desired to add surfactants, as known in the art, to the portion of the floodwater containing the viscosity increasing material in order to wet the surfaces of the rock formation, it sometimes becomes necessary to increase the amount of viscosity-increasing materials added to the floodwater and surfactant mixtures. Where surfactants are present in the floodwater the viscosity-increasing material should be maintained within a concentration range of about 0.05 percent to 0.20 percent by volume. At concentrations greater than listed above, the flood front is unnecessarily restricted from passing through the formation with resultant waste of power, time, and materials. At concentrations lower than those listed above, the flood front is not sufficiently uniform, the floodwater fingers through the formation, and sometimes large volumes of hydrocarbons are bypassed in the formation. It is preferred, however, that the total volume of gel particles injected into the formation be greater than the total volume of viscosity-increasing materials injected in order to maintain the process at an economically feasible level while adequately controlling the movement of the flood front through the hydrocarbon-containing formation. It is also preferred to first inject the viscosity-increasing materials immediately followed by the gel particles. Since the gel suspensions function by pore plugging, that fraction cannot be expected to reach the efficiency of all displacement attained by the viscous fluids by mobility reduction. Preceding the gel particle flooding portion with a volume of viscous flood fraction will thereby produce hydrocarbons beyond those volumes that can be produced by gel flooding or flooding by floodwater alone. The flood of this invention can also be carried by successfully altering the viscosity and gel additives or by periodically following the floodwater containing the gel particles with a volume of gel water alone. The duration of each sequence and volume of each liquid mixture injected will depend upon the properties of the hydrocarbon-containing formation and the in-place hydrocarbons. These properties can be discovered as known in the art by core and fluid sample analyses. Injection pressure records and injectivity profile studies during the injection are also useful tools in determining whether or not the additives of this invention should be increased or decreased to maintain a uniform flood front.

One example of a flooding method of this invention is as follows:

EXAMPLE

On a pore volume (PV) basis the following slugs of material are injected into an oil reservoir which preferably has not been previously water flooded:

0.1 to 0.2 PV of water viscosified with 500 p.p.m. Kelzan;

0.6 to 0.8 PV of water containing 0.1 volume percent gel particles, these particles being composed of 2,000 p.p.m. partially hydrolyzed polyacrylamide and 400 p.p.m. ferric chloride hexahydrate; and 0.2 PV water After injecting the above material mixture, water is injected into the formation to move the material slug through the formation. Intermittently, additional slugs of material are injected into the well.

Other modifications and alterations of this invention will become apparent to those skilled in the art from the foregoing discussion, and it should be understood that this invention is not to be unduly limited thereto.

What is claimed is:

1. A method for recovering hydrocarbons from a subterranean hydrocarbon-containing formation penetrated by at least one injection well and at least one remotely located producing well, comprising:

injecting a substantially continuous stream of floodwater downwardly through the injection well and into the formation;

intermittently injecting a volume of viscous viscosity-increasing material into the floodwater and the formation at a plurality of spaced-apart time intervals;

intermittently injecting a volume of gel particles into the floodwater and the formation at a plurality of spaced-apart time intervals, said gel particles being a material different from said viscosity-increasing material, being selected from the group consisting of partially hydrolyzed polyacrylamides gelled with polyvalent metal ions or formaldehyde and lignosulfonate gelled with sodium dichromate, and being injected at intervals separated from said viscosity-increasing material; and producing to the surface the hydrocarbons entering the producing well.

2. A method, as set forth in claim 1, wherein the viscosity-increasing material is selected from a group consisting of partially hydrolyzed polyacrylamides, carboxymethyl cellulose, or guar gum.

3. A method, as set forth in claim 1, wherein the portion of the floodwater having gel material therein has a gel material concentration in the range of about 0.1 percent to 0.001 percent by volume.

4. A method, as set forth in claim 1, wherein the portion of the floodwater having viscosity increasing material therein has a viscosity-increasing material concentration in the range of about 0.05 percent to 0.1 percent by volume.

5. A method, as set forth in claim 1, further including a volume of surfactant mixed with the viscosity-increasing material, and said viscosity-increasing material concentration being in the range of about 0.05 percent to 0.020 percent by volume.

6. A method, as set forth in claim 1, wherein each portion of floodwater containing viscosity-increasing material is injected into the formation and immediately followed by a portion of floodwater containing gel particles.

7. A method, as set forth in claim 1, wherein the volume of gel particles injected into the formation is greater than the volume of viscosity-increasing material injected.

8. A method, as set forth in claim 1, wherein the floodwater, viscosity-increasing material, and gel particles are injected into the formation through a plurality of spaced-apart injection-wells.

9. A method as set forth in claim 1, wherein injected volumes of floodwater and viscosity-increasing material and floodwater and gel particles are followed by a volume of only floodwater.

* * * * *